United States Patent [19]
Zeng et al.

[11] Patent Number: 5,854,744
[45] Date of Patent: Dec. 29, 1998

[54] ADAPTIVE PROCESS CONTROL SYSTEM

[75] Inventors: Jiyue Zeng, Novi; Jose P. Munoz, Brighton, both of Mich.

[73] Assignee: Ingersoll-Rand Company, Woodcliff Lake, N.J.

[21] Appl. No.: 670,024

[22] Filed: Jun. 25, 1996

[51] Int. Cl.$^6$ ................................................. G05B 13/00
[52] U.S. Cl. ........................ 364/154; 340/679; 364/152; 364/153
[58] Field of Search .................... 340/679, 680, 340/870.09; 364/148, 152, 153, 154, 155, 130, 400, 468.15, 468.24, 474.15, 474.16, 475.09, 479.14

[56] References Cited

U.S. PATENT DOCUMENTS

| | | | |
|---|---|---|---|
| 3,460,013 | 8/1969 | Gaylor | 364/148 X |
| 3,515,860 | 6/1970 | Fitzgerald, Jr. | 364/155 X |
| 3,519,998 | 7/1970 | Barron | 364/152 X |
| 3,548,170 | 12/1970 | Bruce et al. | 364/130 |
| 3,548,172 | 12/1970 | Centner et al. | 364/153 X |
| 5,232,155 | 8/1993 | Chen | 239/71 |
| 5,481,260 | 1/1996 | Buckler et al. | 340/870.09 |
| 5,682,309 | 10/1997 | Bartusiak et al. | 364/149 |
| 5,719,480 | 2/1998 | Bock et al. | 318/568.11 |
| 5,740,081 | 4/1998 | Suzuki | 364/474.01 |

OTHER PUBLICATIONS

"Feasibility of Monitoring Abrasive Waterjet Conditions by Means of a Vacuum Sensor", by Jiyue Zeng and Jose Munoz.

*Primary Examiner*—Edward R. Cosimano
*Attorney, Agent, or Firm*—George Kurtossy; Leon Nigohosian, Jr.

[57] ABSTRACT

An abrasive waterjet cutting system is monitored and controlled by measuring at least one process parameter and using that measurement as a comparison with a running average of the process parameter as it may change over time. Optionally, the rate of change of the process parameter may also be used to signal an emergency condition, and extreme outer limits of the process parameter may be used to define unacceptable operating conditions.

15 Claims, 4 Drawing Sheets

ADAPTIVE PROCESS CONTROL SYSTEM

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

This invention relates to process control; more particularly, the invention relates to an adaptive process control system which may be used in an abrasive waterjet cutting assembly in which at least one parameter of the process is used to control the various parts thereof in such a manner that abrupt process changes are distinguished from gradual process changes.

BACKGROUND OF THE INVENTION

The prior art is replete with process control systems in which one, or more, parameters of the system are continuously monitored and in which the process is suitably modified in response to the results of such monitoring. That is, any one or more of the process parameters have upper and lower limits assigned to them and if the system drifts, or jumps, beyond these limits, appropriate action is taken, such as, for example, a complete shutdown if the particular parameter happens to be a vital one. An inherent conflict in such process control system is always between the need for rapid response in the case of an emergency and the avoidance of over-reaction to a momentary condition which has no real emergency significance. That is, slow and gradual changes may eventually push the system to the outer boundaries of its performance envelope but this does not signify a true emergency condition.

Accordingly, it is an object of this invention to provide a control system which adapts to gradual changes in the various operating process parameters of the system without unduly triggering shutdowns when there is no real emergency.

It is another object of the invention to provide a process control system in which the system will respond to rapid changes that do not exceed the conventional system limits.

SUMMARY OF THE INVENTION

In accordance with one aspect of the invention, the adaptive process control system monitors a selected one or more process parameters. The system not only determines the value of a signal representing such a parameter but also detects when such signal is beyond the limits established for the system.

In addition to measuring the value of the process parameter signal, the system also determines the rate of change of the signal so that truly abrupt changes are appropriately monitored, regardless of whether such abrupt changes exceed the conventional limits of a system.

Furthermore, the system calculates a running average of the process parameter signal which also has appended thereto outer limits, both upper and lower. Thus, gradual changes in the system, such as accumulated wear and tear, prevent an emergency reaction when none is necessary. The boundaries, i.e. the upper and lower limits for such a signal simply "float" with the running average.

In accordance with another aspect of the invention, there is an optional "start-up" control which has its own limits which determine, immediately upon start-up of the system, whether the gross parameters have not been met and therefore should prevent even start-up.

These and other objects, features, and advantage of the invention will be further described with reference to the accompanying drawings, showing a preferred embodiment thereof as utilized in an abrasive waterjet cutting system.

DETAILED DESCRIPTION

Figure 1:
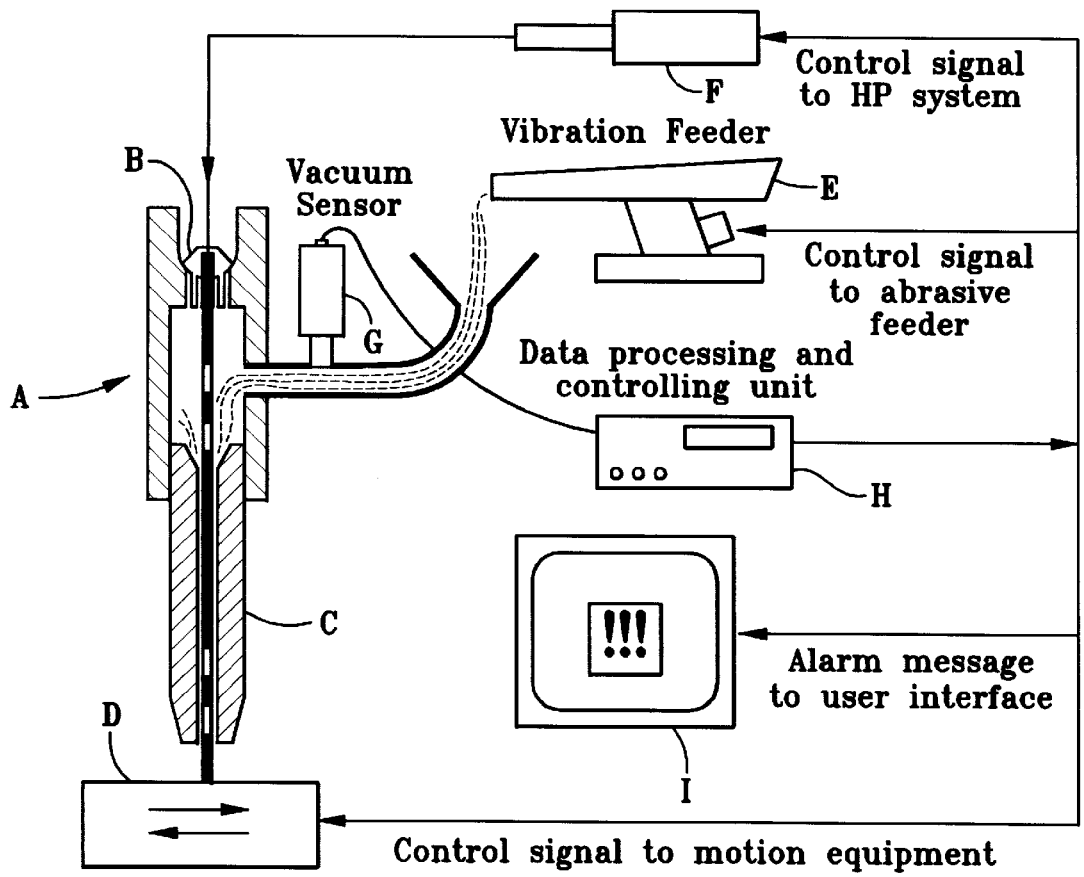
FIG. 1 shows a broad symbolic diagram of how the adaptive process control system of the invention can be applied to an abrasive waterjet cutting system.

With reference to FIG. 1, there is shown a broad system diagram of an embodiment of the invention as applied to an abrasive waterjet cutting, or machining system. Briefly, a nozzle, generally indicated at "A", is comprised of an orifice B and a focusing tube C applying a mixture of high pressure water and abrasive to a moving workpiece "D". The nozzle assembly A is supplied abrasive from a vibration feeder E and high pressure water from a source F.

A vacuum sensor G senses the pressure conditions inside nozzle A and provides a sensor signal to a data processing and controlling unit H whose output controls not only the motion of a workpiece D but also the feed from feeder E, and the feed of high pressure water from source F. Controlling unit H also feeds a display circuit I for the display of any alarm messages.

In operation, as high pressure water and abrasives are supplied to the nozzle, the workpiece D is moved back and forth under the control of equipment (not shown) to maneuver the workpiece for the desired cutting or machining effect. Gradual changes in either water pressure, abrasive feed, or nozzle wear, are sensed by the vacuum sensor G which provides its signal to the data processing and controlling H so that unit H can distinguish emergency conditions from gradual changes. If an emergency condition has indeed been reached, the data processing and controlling unit H will shutdown one, more, or all, of the principal moving parts of the system. In addition, the data processing and controlling system H will also flash an alarm message to the display I.

Figure 2:
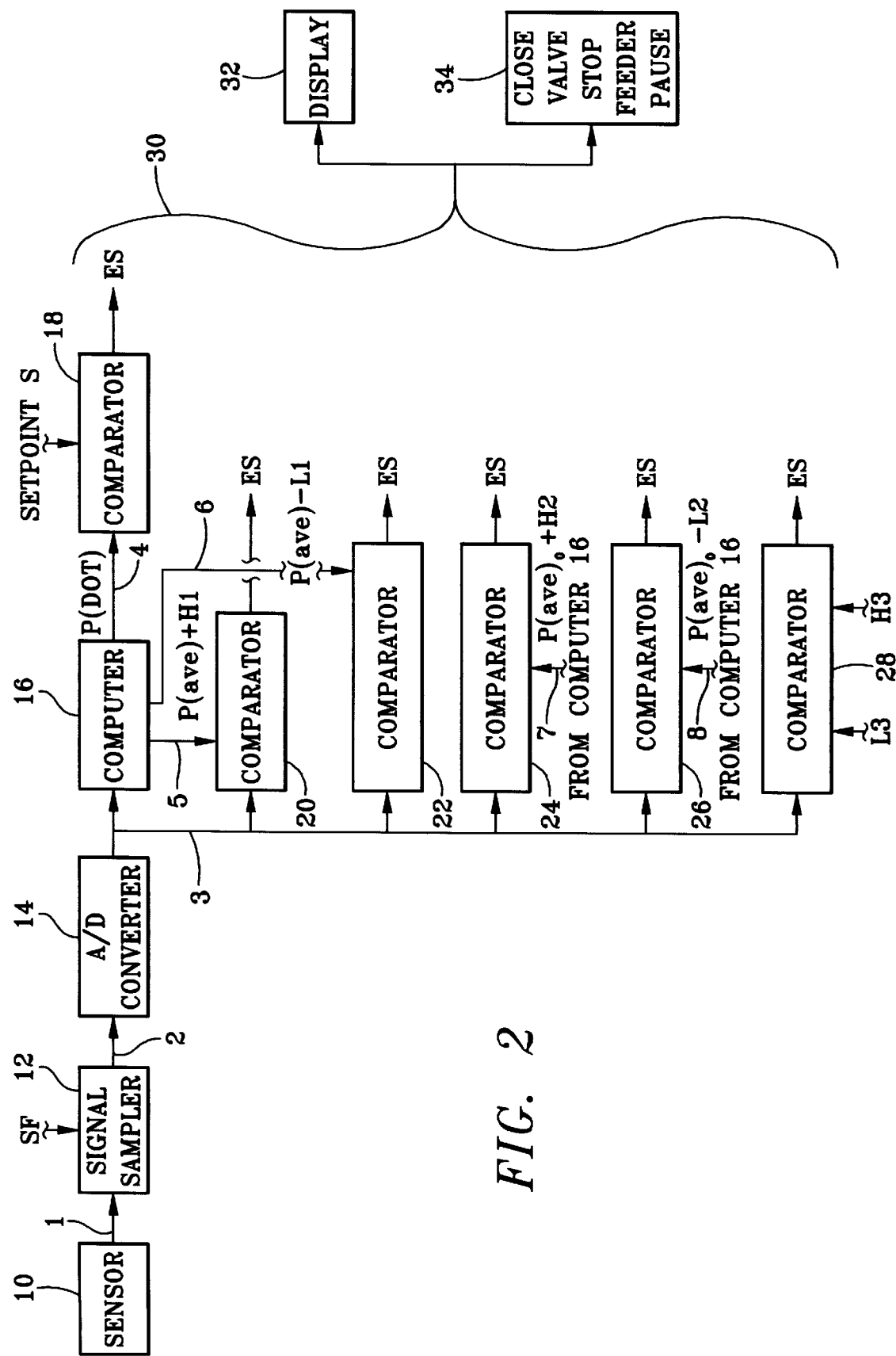
FIG. 2 is a functional block diagram of one embodiment of the adaptive process control system according to the invention.
Figure 2A:
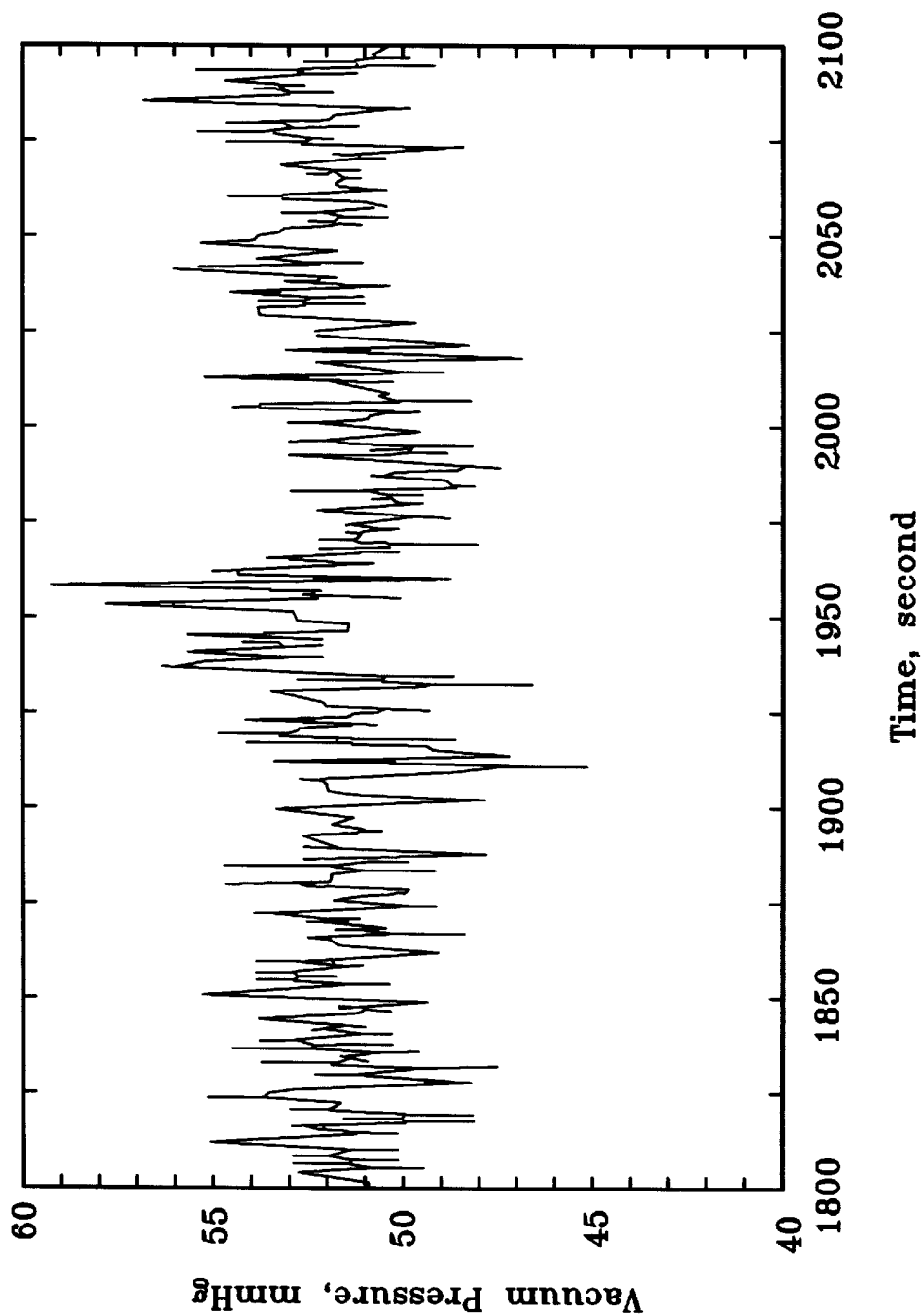
FIG. 2a shows a reproduction of the wave form actually generated by a sensor used in the invention.

With reference to FIG. 2, there is shown a functional block diagram of the apparatus in accordance with the invention. A sensor 10, which may be a vacuum sensor in the preferred embodiment, generates a signal 1, a reproduction of which is shown in FIG. 2A. It is to be noted that signal 1 exhibits significant high frequency content with sharp peaks and valleys and also exhibits a low frequency drift, even within a range of 300 seconds. Such a signal is, by itself, not very useful for process control.

A signal sampler 12, operating at a sampling frequency of SF, repeatedly "samples", i.e. measures, the value of signal 1 and provides its own output signal, signal 2. Sampling frequency, SF, is typically set at a rate of between about 0.1 to 10 Hz but may be higher or lower depending upon the accuracy desired and the capability of the data processing and controlling unit (H) shown in FIG. 1.

An A-D converter 14 receives signal 2 in analog form and converts it into a digital form so that an accurate data processing operation can take place.

A conventional computer 16, programmable in a fashion to be described below, receives the digital version of the sensor signal 3 and generates a number of signals 4, 5, 6, 7, and 8.

The fourth signal, identified in FIG. 2 as "P(DOT)" is provided to a comparator 18 to compare the P(DOT) signal with both an upper and lower set point S to determine whether the rate of change of the process parameter lies beyond acceptable limits. In effect, the P(DOT) signal approximates, more or less, what is mathematically known as the first derivative of signal 1, representing pressure. That is, the larger the number of samples, i.e. the higher sampling frequencies SF, the more signal 4, the P(DOT) signal, will approximate that of a true first derivative. If the P(DOT) signal 4 is beyond the limits set by the set point S, comparator 18 will generate an error signal ES which is then provided, by suitable circuity, along with other error signals ES, to both a display unit 32 and a control unit 34.

Returning to computer 16, it also generates a signal 5 which comprises a calculated average of pressure, P(ave), plus a fixed constant H1. The P(ave) signal is calculated by computer 16 in accordance with the following formula:

$$P(ave) = P + [(T3 \cdot SF - 1) \cdot P(ave)(previous)]/T3 \cdot SF$$

where T3 is an arbitrary timing constant.

The P(ave) signal 5 is continuously updated by computer 16 at the rate of the sampling frequency SF so that a continuously running average is calculated. Thus, the P(ave) signal 5, plus the fixed constant H1, provides a "floating" upper limit of a performance envelope which will change as the system continues in operation. The P(ave) signal plus the H1 constant is provided to a comparator 20 where signal 5 is compared with the actual digital version of signal 3 so that if the value of signal 3 exceeds the value of signal 5, comparator 20 will generate an error signal ES.

Computer 16 also provides a signal 6 which is the same P(ave) running average of the pressure sensor but minus a fixed constant L1 to set a lower limit for the system. Signal 6 and signal 3 are compared in a comparator 22 so that if signal 3 descends below the magnitude of signal 6, comparator 22 will generate an error signal ES. In effect, comparator 22 assures that the signal 3 does not go below the floating, lower set point of the system.

Computer 16 also provides a signal 7 which represents an initial determination of the average pressure, designated $P(ave)_0$ plus a second fixed constant H2. Unlike signals 5 and 6, signal 7, once determined during an initial period, is not thereafter updated so that it does not represent the running average of the P(ave) signals 5 and 6.

Comparator 24 compares signal 3 with signal 7 and if signal 3 is below the upper limit set by signal 7 nothing will happen. However, if signal 3 has a value larger than signal 7, comparator 24 generates an error signal ES in a fashion described with respect to the previous comparators.

Computer 16 also provides a signal 8 to comparator 26. Signal 8 is, like signal 7, the initial average determination, $P(ave)_0$, but adjusted for a lower limit by the constant L2. Comparator 26 will generate a ES signal when the value of signal 3 is below the value of signal 8. If it is, comparator 26 will generate an error signal ES.

As an optional feature, there may be provided an additional comparator 28 having an upper limit H3 and a lower limit L3 which is not influenced by computer 16. Comparator 28 monitors signal 3 to make sure that it is below the upper set point H3 and above the lower set point L3 and is useful for determining, upon start-up, whether the system is within the broadest range of parameters acceptable therefor. If the signal 3 is beyond the boundaries set by H3 and L3, it will generate an error signal ES.

All error signals ES, generated by comparators 18, 20, 22, 24, 26 and 28 are provided by a common connection 30 to a display unit 32 and a control unit 34. The display unit will indicate which particular comparison was unsuccessful and the control unit 34 will initiate, through otherwise conventional mechanisms, such as relays, closure of valves, stopping of feeders, or pausing the equipment moving the workpiece.

Figure 3A:
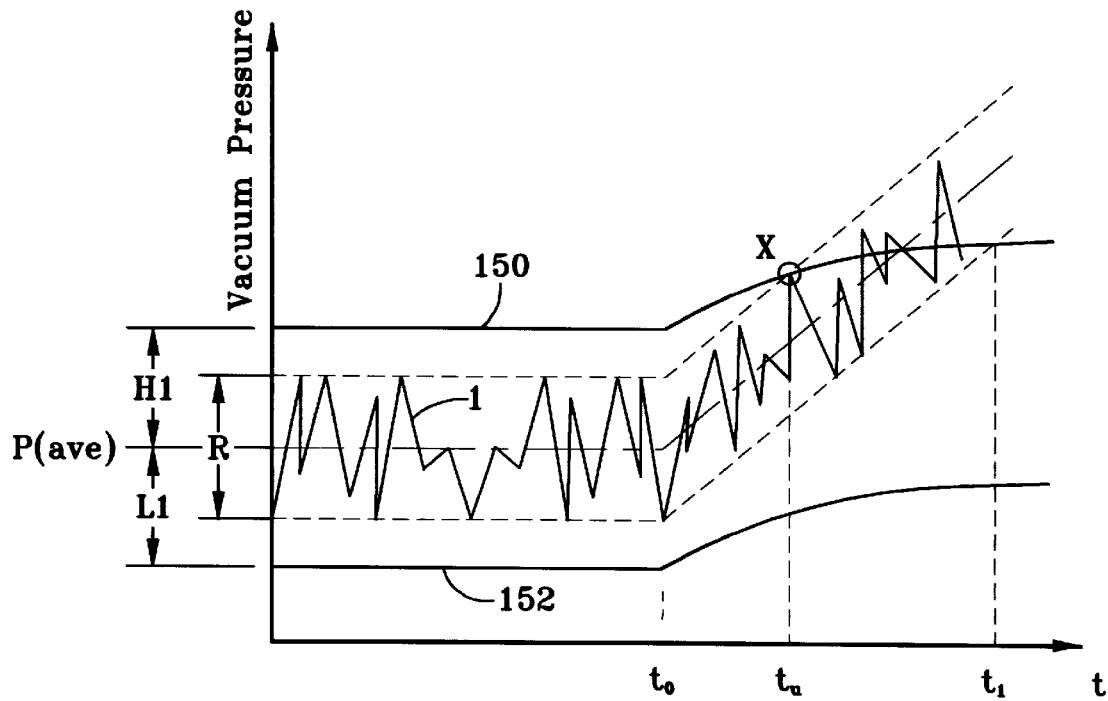
FIG. 3A is a graphical illustration of how the system according to the invention adapts to gradual, non-emergency, changes in the process of the system and also shows a break-through point.
Figure 3:
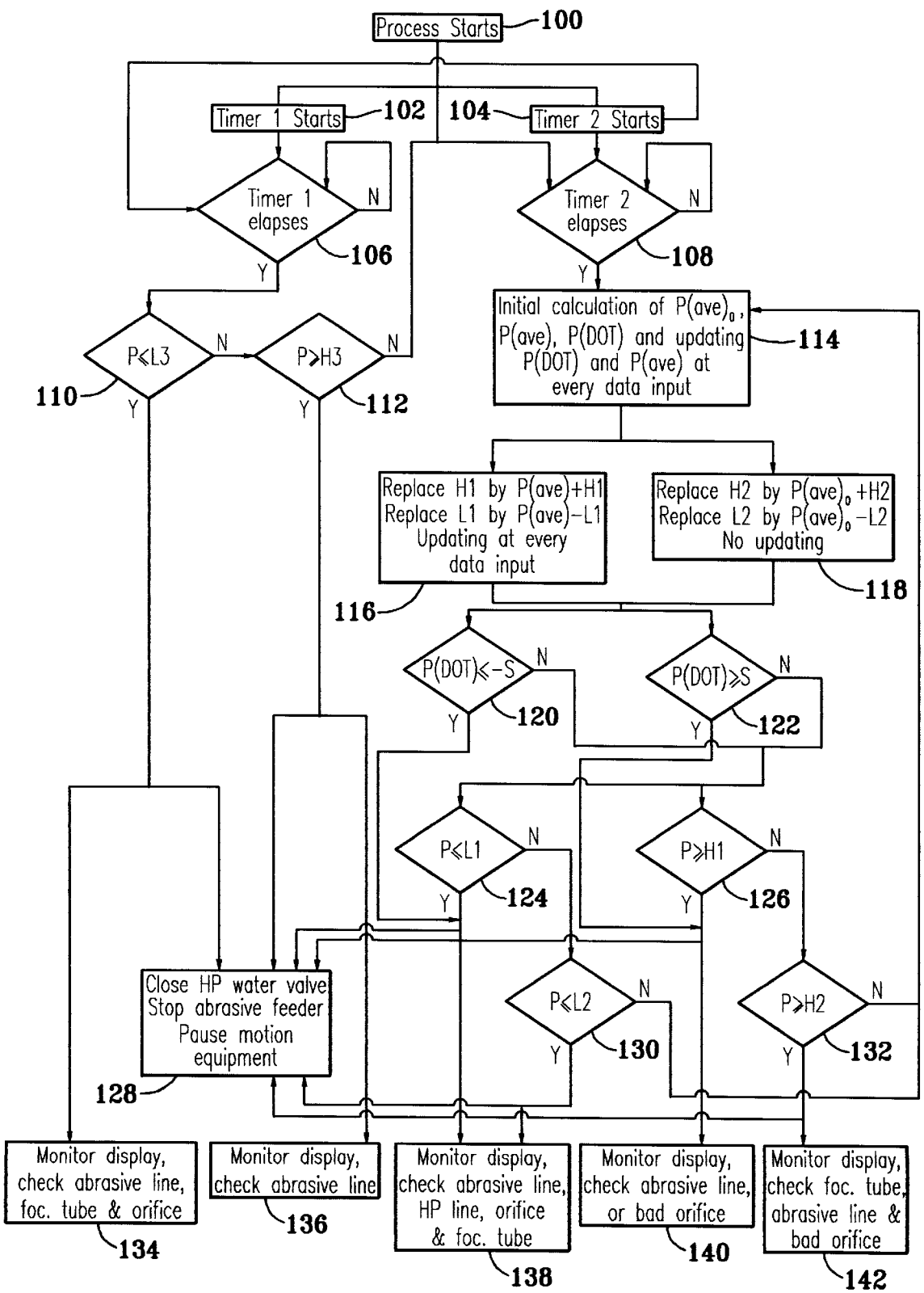
FIG. 3 is a flow chart of the various steps used to operate the adaptive process control system according to one embodiment of the invention.

With reference now to FIG. 3, there is a flow chart illustrating the method of control of an adaptive process control system in accordance with the invention.

At step 100 the process is started by the closure of, for example, a main switch (not shown). This process starts the various units shown in FIG. 1.

At step 102, a first timer, timer 1, starts counting down, and a second timer, timer 2 starts at the same instant in step 104.

Step 106 determines whether timer 1 has reached its zero count and if not step 106 is repeated until timer 1 does count down.

After steps 110 and 112 have determined that the value of pressure P is above the lower limit L3 and below the upper limit H3 step 108 is repeated until timer 2 has counted down to zero. Once timer 2 has counted down, in step 114 the computer 16 (shown in FIG. 2) calculates the values for $P(ave)_o$, P(ave), and P(DOT) signals which are derived from P as described above. As shown in step 114,, P(ave) and P(DOT) signals are calculated and updated every time that data is received by computer 16. That is, data is updated at the rate of the sampling frequency SF. Subsequent to step 114, step 116 modifies the running average P(ave) with fixed constants H1 and L1 to indicate the floating, set point. This is best illustrated by reference to FIG. 3A where the upper and lower set points are shown as changing the "envelope" within which the P(ave) signal may operate over a period of time. That is, the floating upper limit is denoted graphically by line 150 while the lower limit line is denoted by line 152. In accordance with the previous notation, the wave form 1 represents the signal from sensor 10 and R represents the range of variation typically encountered in the signal 1. Point "x" identifies when the upper limit has been exceeded.

Returning now to FIG. 3, in step 118 the computer makes an initial determination of $P(ave)_o$ (not updated) and modifies them by the fixed constants H2 and L2. In practice, the fixed constants H2 and L2 are larger in magnitude than the fixed constants H1 and L1 and, dependent upon system choices, each constant H1, L1, H2 and L2 may have different values.

Typical values of a representative set of fixed constants for a particular system may be:

H1: 10 mmHg

L1: 10 mmHg

H2: 12.7 mmHg

L2: 12.7 mmHg

H3: 254 mmHg

L3: 25.4 mmHg

S: 3.5 mmHg/s

In steps 120 and 122 a determination is made whether the P(DOT) signal, shown in FIG. 3 as P(DOT) is within the limits dictated by a set point S and this step determines whether the rate of change of the P(DOT) signal is beyond the limits set by the set point S. If that is the case, the routine will generate a "Yes" that will flow through the system in a manner to be described later. If the rate of change of the pressure represented by the P(COT) signal is within the limits set by the setpoints, the routine will generate a "No" and proceed on to steps 124 and 126 as shown in FIG. 3.

In steps 124 and 126 the value of signal P (signal 3 in FIG. 2) is compared against lower limit L1 and upper limit H1. If signal P is beyond the limits set, further actions as will be described below will take place. If signal P is within the limits set, the routine will generate a "No" and proceed on to steps 130 and 132 as shown in FIG. 3.

In steps 130 and 132 signal P is compared to the broader band set by constants H2 and L2 and, again, an indication that signal P is beyond either limit, will likewise generate a "Yes" message. If signal P is within the limits set, the routine will generate a "No" and proceed to return to step 114 as shown in FIG. 3 where the values of P, P(DOT) and P(ave) are updated and the routine repeats using these new values.

A review of FIG. 3 will show that all "Yes" messages generated by steps 110, 112, 120, 122, 124, 126, 130, and 132, will lead to step 128 where a number of corrective actions will be caused to occur such as closure of the high pressure valve, stopping of the abrasive feeder, and pause in the equipment moving the workpiece D (see FIG. 1).

In addition, all "Yes" results from the previously identified comparison steps will lead to a monitoring display, as illustrated in steps 134, 136, 138, 140, and 142 which will tell the operator what particular fault is likely to have occurred in the system.

The calculation described herein may be performed by any conventional mathematics program, for example, "MATHCAD 6.0 PLUS" mathematics program (TM of the Mathsoft Corp., Cambridge, Mass).

It is to be noted that the system described will also function adequately if comparators 18, 24 and 26 are made optional, i.e. that they are not necessarily a part of the optimum system.

The foregoing description has illustrated the features, aspects and advantages of the invention, but it is to be understood that the invention may have several modifications and is to be limited only by the claims appended hereto.

What is claimed is:

1. An adaptive process control system comprising:
   a) means for measuring at least one process parameter and generating a time varying analog signal, defined as a first signal, representative of such parameter;
   b) sampling means for periodically sampling, at a selected sampling rate, such first signal and providing a second signal;
   c) means responsive to the second signal for converting the second signal to a digital form, defined as a third signal, reflecting the value of the process parameter;
   d) a computer responsive to the third signal for providing fourth, fifth, sixth, seventh and eighth signals, the fourth signal representing the value of the rate of change of the process parameter;
   the fifth signal representing a value of the running average of the process parameter, updated at the sampling rate plus a first constant;
   the sixth signal representing a value of the running average of the process parameter, updated at the sampling rate, minus a second constant;
   the seventh signal representing a non-running average of the process parameter plus a third constant;
   the eight signal representing a non-running average of the process parameter minus a fourth constant; and
   e) comparison means for comparing the values of the third signal with the values of each of the fifth through eighth signals and for generating respective error signals when the value of the third signal reflects a value beyond the value of the fifth through eighth signals and where the value of the fourth signal is beyond the value defined by a fifth constant.

2. System according to claim 1 including comparison means to compare the third signal with pre-set sixth and seventh constants and for generating an error signal when the value of the third signal is beyond the limits defined by the sixth and seventh constants.

3. System according to claim 1 wherein the sampling rate is between about 0.1 to 10 Hz.

4. System according to claim 1 further including means for displaying the error signals to identify which comparison has failed.

5. System according to claim 1 further including means responsive to the error signals for controlling the process.

6. System according to claim 1 wherein the process is an abrasive waterjet system.

7. System according to claim 6 wherein the process parameter is pressure within a nozzle in the abrasive waterjet system.

8. Method for adaptively controlling a process comprising:
   a) measuring at least one process parameter and generating a time varying analog signal, defined as a first signal, representative of such parameter;
   b) periodically sampling, at a selected sampling rate, such first signal and providing a second signal;
   c) converting the second signal to a digital form, defined as a third signal, reflecting the value of the process parameter;
   d) providing fourth, fifth, sixth, seventh and eighth signals in response to the third signals, the fourth signal representing the value of the rate of change of the process parameter;
   the fifth signal representing a value of the running average of the process parameter, updated at the sampling rate plus a first constant;
   the sixth signal representing a value of the running average of the process parameter, updated at the sampling rate, minus a second constant;
   the seventh signal representing a non-running average of the process parameter plus a third constant;
   the eight signal representing a non-running average of the process parameter minus a fourth constant; and
   e) comparing the values of the third signal with the values of each of the fifth through eighth signals and generating respective error signals when the value of the third signal reflects a value beyond the value of the fifth through eighth signals and where the value of the fourth signal is beyond the value defined by a fifth constant.

9. Method according to claim 8 including the further step of comparing the third signal with pre-set sixth and seventh constants and for generating an error signal when the value of the third signal is beyond the limits defined by the sixth and seventh constants.

10. Method according to claim 8 wherein the sampling rate is between about 0.1 to 10 Hz.

11. Method according to claim 8 further including the step of displaying the error signals to identify which comparison has failed.

12. Method according to claim 8 further including a step for controlling the process in response to the error signals.

13. Method according to claim 8 wherein the process is an abrasive waterjet cutting process.

14. Method according to claim 13 wherein the process parameter is pressure within a nozzle in the abrasive waterjet system.

15. An adaptive process control system comprising:

a) means for measuring at least one process parameter and generating a time varying analog signal, defined as a first signal, representative of such parameter;

b) sampling means for periodically sampling, at a selected sampling rate, such first signal and providing a second signal;

c) means responsive to the second signal for converting the second signal to a digital form, defined as a third signal, reflecting the value of the process parameter;

d) a computer responsive to the third signal for producing several signals, one representing a value of the running average of the process parameter, updated at the sampling rate, plus a first constant and one representing a value of the running average of the process parameter, updated at the sampling rate, minus a second constant; and e) comparison means for comparing the value of the third signal with the values of the signal produced by element d) and for generating error signals when the value of the third signal reflects a value outside the range of values established by element d).

* * * * *